(12) United States Patent
Nagano et al.

(10) Patent No.: US 11,294,795 B2
(45) Date of Patent: Apr. 5, 2022

(54) FAULT REPRODUCTION ASSIST SYSTEM, FAULT REPRODUCTION ASSIST METHOD

(71) Applicant: HITACHI, LTD., Tokyo (JP)

(72) Inventors: Takehiko Nagano, Tokyo (JP); Tatsuaki Osafune, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/807,761

(22) Filed: Mar. 3, 2020

(65) Prior Publication Data
US 2020/0285560 A1     Sep. 10, 2020

(30) Foreign Application Priority Data

Mar. 5, 2019   (JP) .............................. JP2019-039838

(51) Int. Cl.
G06F 11/36    (2006.01)
G06F 8/60     (2018.01)
G06F 9/445    (2018.01)

(52) U.S. Cl.
CPC .............. *G06F 11/366* (2013.01); *G06F 8/60* (2013.01); *G06F 9/44505* (2013.01)

(58) Field of Classification Search
CPC ....... G06F 11/366; G06F 8/60; G06F 9/44505
See application file for complete search history.

(56) References Cited

U.S. PATENT DOCUMENTS

| | | | | |
|---|---|---|---|---|
| 9,442,832 B2 * | 9/2016 | Bharara | .............. | G06F 11/0748 |
| 10,805,185 B2 * | 10/2020 | Kolar | ...................... | H04L 43/04 |
| 10,891,219 B1 * | 1/2021 | Dimitropoulos | ...... | G06F 11/366 |
| 2007/0033281 A1 * | 2/2007 | Hwang | ................. | G06F 11/366 709/224 |
| 2007/0168994 A1 * | 7/2007 | Barsness | ............... | G06F 11/362 717/129 |
| 2008/0126880 A1 * | 5/2008 | Hegarty | .............. | G06F 11/3684 714/46 |

(Continued)

FOREIGN PATENT DOCUMENTS

JP        2004-227439 A      8/2004

OTHER PUBLICATIONS

Extended European Search Report dated Jun. 15, 2020 for the European Patent Application No. 20157365.6.

*Primary Examiner* — Douglas M Slachta
(74) *Attorney, Agent, or Firm* — Volpe Koenig

(57) ABSTRACT

A fault reproduction assist system that assists a fault reproduction of an abnormal vehicle includes a configuration information acquisition unit that acquires, based on configuration information that is received from the abnormal vehicle and that includes hardware information of hardware in which an abnormality is detected and vehicle configuration information stored in advance in a storage unit, configuration information including the same hardware information as the hardware information of the abnormal vehicle; a configuration information determination unit that acquires from the storage unit software that includes the same software information as software information included in the configuration information acquired by the configuration information acquisition unit, and a distribution unit that distributes the software acquired by the configuration information determination unit to a fault reproduction environment for reproducing a fault.

8 Claims, 10 Drawing Sheets

(56) References Cited

U.S. PATENT DOCUMENTS

| | | | |
|---|---|---|---|
| 2008/0155340 A1* | 6/2008 | Tsun | G06F 16/93 714/38.14 |
| 2008/0208672 A1* | 8/2008 | Van Riel | G06Q 10/06311 705/7.13 |
| 2009/0307763 A1* | 12/2009 | Rawlins | G06F 11/3672 726/5 |
| 2011/0283266 A1* | 11/2011 | Gallagher | G06F 9/44 717/130 |
| 2011/0314335 A1* | 12/2011 | Tanaka | G06F 11/263 714/33 |
| 2012/0144374 A1* | 6/2012 | Gallagher | G06F 11/3466 717/128 |
| 2013/0152047 A1* | 6/2013 | Moorthi | G06F 11/368 717/124 |
| 2013/0173964 A1* | 7/2013 | Okano | G06F 11/2294 714/33 |
| 2015/0127983 A1* | 5/2015 | Trobough | G06F 11/2733 714/30 |
| 2017/0075800 A1* | 3/2017 | Peng | G06F 11/3692 |
| 2017/0109263 A1* | 4/2017 | Anand | G06F 11/3676 |
| 2017/0139782 A1* | 5/2017 | Chen | G06F 16/27 |
| 2017/0269986 A1* | 9/2017 | Sobue | G06F 11/0751 |
| 2017/0270236 A1* | 9/2017 | Yamaura | G06F 30/20 |
| 2018/0157343 A1* | 6/2018 | Mickelsen | G06F 3/0346 |
| 2018/0196732 A1* | 7/2018 | Dolev | G06F 9/45558 |
| 2019/0034191 A1* | 1/2019 | Fox | G06F 8/65 |
| 2019/0079849 A1* | 3/2019 | Korn | G06F 11/3457 |
| 2019/0196898 A1* | 6/2019 | Sekiguchi | G06F 11/34 |
| 2019/0286546 A1* | 9/2019 | Johnston | G06F 11/006 |
| 2020/0034284 A1* | 1/2020 | Solan | G06F 9/45558 |
| 2020/0081822 A1* | 3/2020 | Cui | G05D 1/0055 |

\* cited by examiner

FIG. 5

| # | TYPE | NAME | VALUE (ID) | PARENT INFORMATION |
|---|------|------|------------|--------------------|
| 1 | ID | VIN | 010 | - |
| 2 | H/W | ECU | AD01 | VIN-010 |
| 3 | H/W | Sub Micro Computer | ST01 | ECU-AD01 |
| 4 | S/W | Application | app2 | SMC-ST01 |

FIG. 7

| # | VEHICLE NAME | HARDWARE NAME | HARDWARE ID | SOFTWARE NAME | SOFTWARE ID | DISTINCTION |
|---|---|---|---|---|---|---|
| 1 | SEDAN A | AD-ECU | AD01 | app1 | app1-1.0 | CORRESPONDING |
| 2 | SEDAN A | AD-ECU | AD02 | app1 | app1-1.1 | RELATED |
| 3 | SUV α | AD-ECU | AD02 | app1 | app1-1.1 | RELATED |
| 4 | SUV β | AD-ECU | AD02 | app1 | app1-1.2 | RELATED |
| ... | ... | ... | ... | ... | ... | ... |
| N | MINIVAN X | AD-ECU | AD01 | app1 | app1-1.0 | CORRESPONDING |

FIG. 9

| # | DATE | VIN | VEHICLE NAME | MODEL | PRIME MOVER TYPE | CONTENT | HARDWARE NAME | HARDWARE ID | SOFTWARE NAME | SOFTWARE ID | MILEAGE | RUNNING ROUTE | FAULT ACTUALIZING LOCATION | WEATHER | OTHERS |
|---|---|---|---|---|---|---|---|---|---|---|---|---|---|---|---|
| 91 | 92 | 93 | 94 | 95 | 96 | 97 | 98 | 99 | 910 | 911 | 912 | 913 | 914 | 915 | 916 |
| 1 | 2018/09/01 | 1A1AA A1A_A A123456 | SEDAN A | ABC-DE1 | AA1 | AUTOMATIC OPERATION FAULT-BRAKE | AD-ECU | AD01 | app1 | app1-1.0 | 50,000km | YOKOHAMA → HAKONE | ODAWARA | RAINY | DRIVE RECORDER, GPS DATA |
| 2 | 2018/09/02 | 1A1AA A1A_A A123123 | SEDAN A | ABC-DE1 | AA1 | AUTOMATIC OPERATION FAULT-BRAKE | AD-ECU | AD02 | app1 | app1-1.1 | 38,000km | WARABI → SENDAI | MITO | CLOUDY | NONE |
| ... | ... | ... | ... | | | | | ... | ... | ... | ... | ... | | | |
| N | 2018/09/15 | 1D1DD D1A_B C123122 | MINIVAN X | DEF-AB2 | BB3 | AUTOMATIC OPERATION FAULT-OBJECT DETECTION | AD-ECU | AD01 | app1 | app1-1.0 | 1,000km | HAKODATE → ASAHIKAWA | SAPPORO | SUNNY | SOFTWARE LOG |

FIG. 10

| 1001 FAULT MANAGEMENT INFORMATION | FAULT NUMBER | F001 | |
|---|---|---|---|
| | TITLE | AD-ECU ABNORMALITY | |
| | CONTENT | DURING AUTOMATIC DRIVING ON HIGHWAY, STOP IN DRIVING LANE DUE TO BRAKE MALFUNCTION | |
| 1002 VEHICLE INFORMATION | VEHICLE NAME | SEDAN A | |
| | MODEL | ABC-DE1 | |
| | PRIME MOVER TYPE | AA1 | |
| 1003 CONFIGURATION INFORMATION | VIN | 1A1AAA1A_AA123456 | |
| | HARDWARE NAME | AD-ECU | |
| | HARDWARE ID | AD01 | |
| | SOFTWARE NAME | app1 | |
| | SOFTWARE ID | app1-1.0 | |
| 1004 REFERENCE INFORMATION | MILEAGE | 50,000km | |
| | RUNNING ROUTE | YOKOHAMA (DEPARTURE) HAKONE(REACH) | |
| | FAULT ACTUALIZING LOCATION | ODAWARA | |
| | WEATHER | RAINY | |
| | SUPPLEMENTARY INFORMATION | DRIVE RECORDER, GPS DATA | |
| 1005 RELATED VEHICLE INFORMATION | SIMILAR VEHICLE TYPE 1 | VEHICLE NAME | SEDAN A |
| | | HARDWARE NAME | AD-ECU |
| | | HARDWARE ID | AD02 |
| | | SOFTWARE NAME | app1 |
| | | SOFTWARE ID | app1-1.1 |
| | SIMILAR VEHICLE TYPE 2 | VEHICLE NAME | SUV α |
| | | HARDWARE NAME | AD-ECU |
| | | HARDWARE ID | AD02 |
| | | SOFTWARE NAME | app1 |
| | | SOFTWARE ID | app1-1.1 |
| | ... | | |
| | SIMILAR VEHICLE TYPE N | VEHICLE NAME | SUV β |
| | | HARDWARE NAME | AD-ECU |
| | | HARDWARE ID | AD02 |
| | | SOFTWARE NAME | app1 |
| | | SOFTWARE ID | app1-1.2 |

FAULT REPRODUCTION ASSIST SYSTEM, FAULT REPRODUCTION ASSIST METHOD

BACKGROUND OF THE INVENTION

1. Field of the Invention

The present invention relates to a fault reproduction assist system and a fault reproduction assist method.

2. Description of the Related Art

In order to specify a cause of a fault such as a failure of a vehicle, there is a technique described in JP-A-2004-227439. JP-A-2004-227439 discloses a technique that increases a reproduction rate of a fault by preparing base vehicles in advance when performing a failure diagnosis of a vehicle with a different usage history, and during the failure diagnosis, selecting a vehicle similar to the vehicle to be diagnosed from the base vehicles and transferring control data on the vehicle to perform the failure diagnosis.

In JP-A-2004-227439, only the control data on the prepared base vehicle is transferred to increase the reproduction rate of the fault. However, from a viewpoint of reproducing a fault in a software program, the fault is not always reproduced unless a prerequisite program and a test environment are prepared. Although JP-A-2004-227439 can improve a reproducibility of the fault limitedly by sending the control data on a similar base vehicle, there are other triggers of a fault reproduction, therefore an effect is limited, and it is not always possible to quickly construct a fault reproduction environment and reproduce the fault.

SUMMARY OF THE INVENTION

Therefore, the invention has an object of quickly reproducing a fault by quickly constructing a fault reproduction environment and providing information for a reproduction when a product fault occurs after vehicle shipment.

A fault reproduction assist system according to one aspect of the invention is a system that assists a fault reproduction of an abnormal vehicle, and the fault reproduction assist system includes a configuration information acquisition unit that acquires, based on configuration information that is received from the abnormal vehicle and that includes hardware information of hardware in which an abnormality is detected and vehicle configuration information stored in advance in a storage unit, configuration information including the same hardware information as the hardware information of the abnormal vehicle; a configuration information determination unit that acquires from the storage unit software that includes the same software information as software information included in the configuration information acquired by the configuration information acquisition unit; and a distribution unit that distributes the software acquired by the configuration information determination unit to a fault reproduction environment for reproducing a fault.

The invention is also understood as a fault reproduction assist method performed in the fault reproduction assist system.

According to one aspect of the invention, the fault can be quickly reproduced by quickly constructing the fault reproduction environment and providing information for the reproduction when the product fault occurs after shipment.

BRIEF DESCRIPTION OF THE DRAWINGS

FIG. 5 is a diagram showing a message, transmitted from the vehicle to the configuration management system server, in FIG. 3.

FIG. 7 is a diagram showing an example of contents of the similar vehicle type list in FIG. 6.

FIG. 9 is a diagram showing an example of a fault report DB in FIG. 1.

FIG. 10 is a diagram showing an example of a test report in FIG. 2.

DESCRIPTION OF THE PREFERRED EMBODIMENTS

Figure 1:
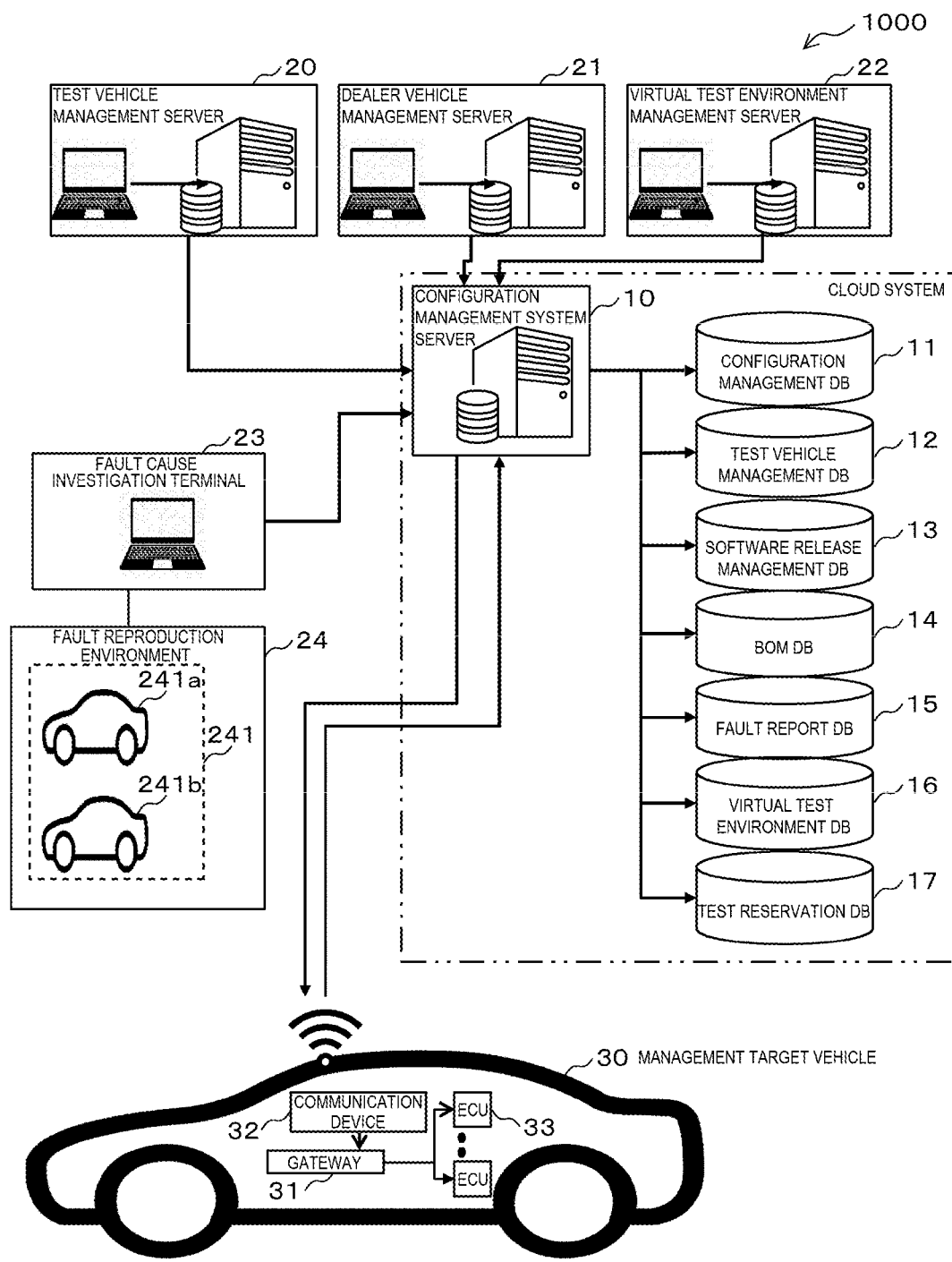
FIG. 1 is a configuration diagram of a fault reproduction assist system according to an embodiment.

Hereinafter, embodiments of the invention will be described with reference to the drawings. The following description and drawings are examples for describing the invention, and are omitted and simplified as appropriate for clarification of the description. The invention can be implemented in various other forms. Each component may be singular or plural, unless otherwise specified.

In order to facilitate understanding of the invention, a position, size, shape, range, or the like of each component illustrated in the drawings may not represent an actual position, size, shape, range, or the like. Therefore, the invention is not necessarily limited to the position, size, shape, range, or the like disclosed in the drawings.

In the following description, various types of information may be described in terms of expressions such as "table" and "list", but the various types of information may be expressed by other data structures. "XX table", "XX list", or the like are referred to as "XX information", to indicate that information does not depend on a data structure. When identification information is described, expressions such as "identification information", "identifier", "name", "ID", and "number" are used, but these expressions may be replaced with each other.

When there are a plurality of components having the same or similar function, same reference numerals may be described with different subscripts being attached. However, when there is no need to distinguish the plurality of components, the subscripts may be omitted.

In the following description, processing performed by executing a program may be described, but since the program is executed by a processor (for example, a CPU or a GPU) to perform predetermined processing while using a storage resource (for example, a memory) and/or an interface device (for example, a communication port), or the like as appropriate, a subject of the processing may be the processor. Similarly, the subject of the processing performed by executing the program may be a controller, device, system, computer, or node including the processor. The subject of the processing performed by executing the program may be a calculation unit, and may include a dedicated circuit (for example, an FPGA or an ASIC) for performing specific processing.

The program may be installed from a program source into a device such as the computer. The program source may be, for example, a program distribution server or a computer-readable storage medium. When the program source is the program distribution server, the program distribution server includes a processor and a storage resource that stores a program to be distributed, and the processor of the program distribution server may distribute the program to be distributed to another computer. In addition, in the following description, two or more programs may be realized as one program, or one program may be realized as two or more programs.

FIG. 1 is a diagram showing an example of a fault reproduction assist system according to an embodiment. A fault reproduction assist system 1000 includes a configuration management system server 10, a test vehicle management server 20, a dealer vehicle management server 21, a virtual test environment management server 22, and a fault cause investigation terminal 23.

The configuration management system server 10 is a server that manages vehicle information after shipment, fault information, and information related to a test environment during development. The configuration management system server 10 distributes a software program that reproduces a fault to a fault test environment 24 including a test environment 242 of OEM and a test vehicle 241a or a dealer vehicle 241b based on information received from a management target vehicle 30.

The test vehicle management server 20 is a server that manages a test vehicle 241 of an automobile manufacturer. The test vehicle management server 20 acquires information related to a usage status of the test vehicle and internal configuration information from the configuration management system server 10, sends contents of the fault occurred in the test vehicle 241 and information (for example, fault information in FIG. 9) related to the contents to the configuration management system server 10, and records the information in a fault report database 15.

The dealer vehicle management server 21 is a server for reproducing a function similar with that of the test vehicle management server 20 on a vehicle owned by a dealer.

The virtual test environment management server 22 is a server that manages a virtual test environment of an automobile manufacturer. The virtual test environment management server 22 reproduces a function similar with the test vehicle management server 20 in the virtual test environment 242.

The fault cause investigation terminal 23 is a terminal for storing and referring to a cause investigation result accumulated in information provision from the automobile manufacturer or the dealer or a reproduction test inside the automobile manufacturer. The fault cause investigation terminal 23 is connected to a fault reproduction environment 24 including the test vehicle 241 and the virtual test environment 242. In this system, processing of reproducing a fault of the management target vehicle 30 that is an automobile vehicle after shipment is performed in such an environment.

The configuration management system server 10 stores a configuration management DB 11, a test vehicle management DB 12, a software release management DB 13, a BOM DB 14, a fault report DB 15, a virtual test environment DB 16, and a test reservation DB 17.

The configuration management DB 11 is a database that manages vehicles shipped to the market by a vehicle-specific number, and manages hardware that is a component, a combination pattern of a software program that runs on that hardware, and the combined software program.

The test vehicle management DB 12 is a database that manages information such as a test vehicle used in the automobile manufacturer, the usage status thereof, and an operation software program during use.

The software release management DB 13 is a database that manages backup data for each revision, release time, or the like for each application program.

The BOM DB 14 is a database that manages hardware design information for each vehicle.

The fault report DB 15 is a database that manages fault information occurred in the market.

The virtual test environment DB 16 is a database that manages information such as a usage status of a test environment in which vehicles other than the test vehicle 241 are simulated and an operation software program during use.

The test reservation DB 17 is a database that manages use reservations of the test vehicle 241 and the virtual test environment 242.

The management target vehicle 30 indicates a vehicle shipped to the market, and includes a gateway 31 serving as a network node for connecting a plurality of ECUs 33 via a network, a communication device 32 for communicating a network packet acquired by the gateway 31 from the ECUs 33 to the configuration management system server using a public line or the like, and the ECUs 33 for engine control or automatic operation control or the like.

Figure 2:
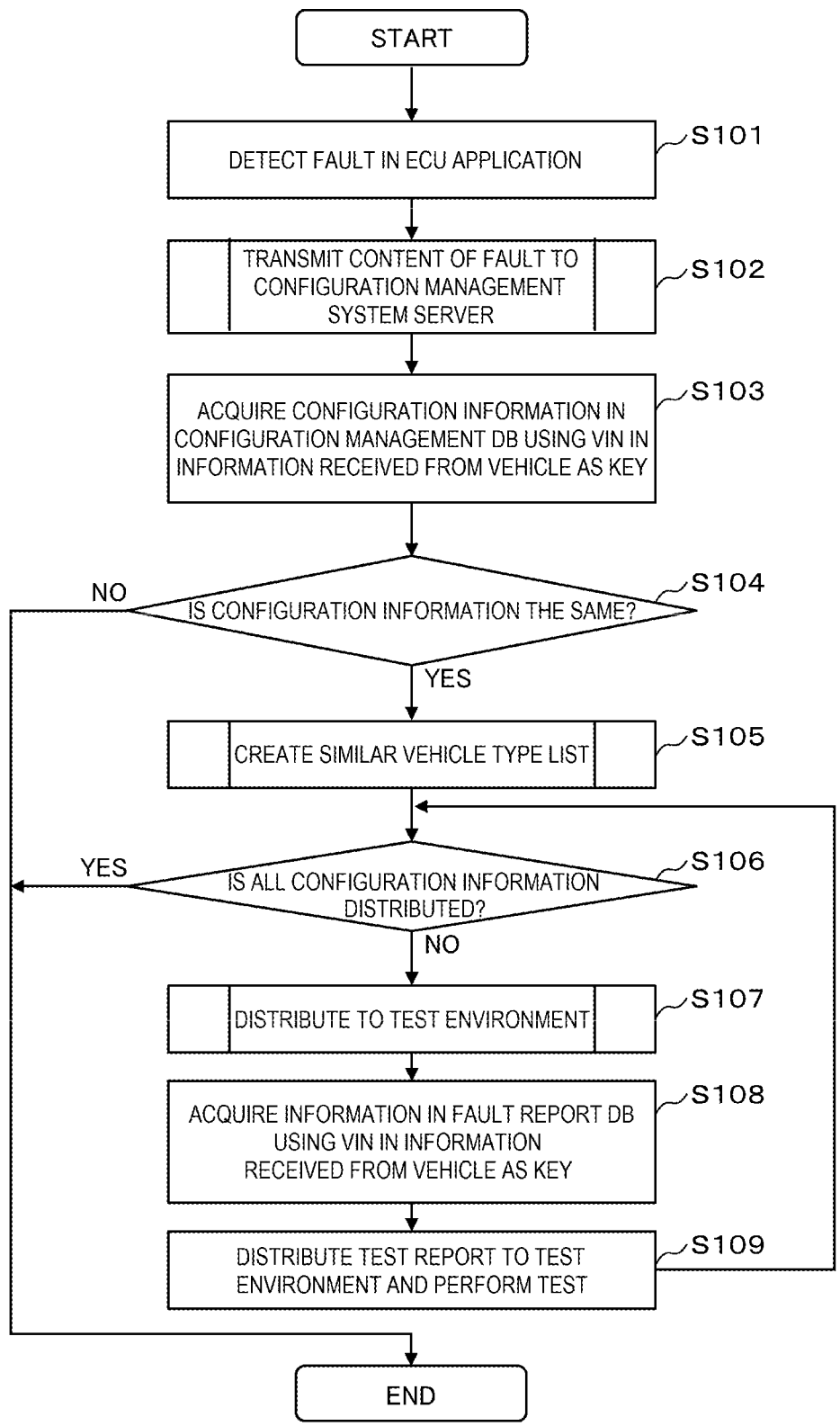
FIG. 2 is a flowchart showing a procedure of a test environment distribution for reproducing a fault.

FIG. 2 is a flowchart showing a procedure of receiving notification from the vehicle 30 in which the fault occurs or a sign of the fault is detected, constructing the fault reproduction environment related to the vehicle 30 in the fault reproduction environment 24 and distributing a test report to a person who performs a reproduction test by the configuration management system server 10.

In step S101, when the ECU 33 of the vehicle 30 detects a fault in the software program operating on the ECU, the processing proceeds to step S102. In step S102, the ECU 33 converts contents of the fault and configuration information of the vehicle 30 in which the fault occurs into a message, transmits the message to the configuration management system server 10, and the processing proceeds to step S103. Specific processing in step S102 will be described later with reference to FIG. 3.

In step S103, the configuration management system server 10 acquires configuration information stored in the configuration management DB 11 using Vehicle Identification Number (VIN: vehicle-specific number information) included in the message received from the vehicle 30 as a key, and the processing proceeds to step S104. In step S104, the configuration management system server 10 determines whether the configuration information transmitted from the vehicle 30 is the same as a configuration of information registered in the configuration management DB 11 of the configuration management system server 10. When the configuration management system server 10 determines that configurations of the both are not the same (step S104; NO), it is determined that the fault reproduction environment 24 cannot be constructed, and the processing ends.

On the other hand, when the configuration management system server 10 determines that configurations of the both are the same (step S104; YES), it is determined that the fault reproduction environment 24 can be constructed, and the processing proceeds to step S105. As for whether the configuration of the configuration information is the same, for example, the configuration information includes a vehicle number (VIN), ECU identification information and microcomputer identification information, and when these values are the same, it may be determined that configurations of the both are the same.

In step S105, the configuration management system server 10 creates a list of both configuration information of the same vehicle and the same vehicle type with the same fault and configuration information of a similar vehicle type of other vehicles with such as different versions of the software program, compatible ECUs of the ECU in which the fault occurs, and other vehicles installed with these devices, and the processing proceeds to step S106. That is, the configuration management system server 10 creates the list of the configuration information of the similar vehicle types in addition to the configuration information of the same vehicle or the same vehicle type, and the processing proceeds to step S106. Hereinafter, the configuration information of the similar vehicle type is to be described, but the configuration information of the same vehicle or the same vehicle type can be considered in the same manner. Specific processing in step S105 will be described later with reference to FIG. 6.

In step S106, the configuration management system server 10 determines whether or not the configuration information related to all similar vehicle types created in step S105 is distributed to the fault reproduction environment 24 that is the test environment.

When the configuration management system server 10 determines that the configuration information related to all the similar vehicle types is distributed to the test environment (step S106; YES), the processing ends. On the other hand, when the configuration management system server 10 determines that the configuration information related to all the similar vehicle types is not distributed to the test environment, that is, there is undistributed configuration information (step S106; NO), the processing proceeds to step S107.

In step S107, the configuration management system server 10 refers to the list created in step S105, distributes a test software program to the fault reproduction environment 24, and the processing proceeds to step S108. Specific processing in step S107 will be described later with reference to FIG. 8.

In step S108, the configuration management system server 10 acquires contents of the fault report DB 15 using the VIN included in the message received from the fault vehicle 30 as a key, and combines the contents with the configuration information of the similar vehicle type used in step S105 to create a test report, and the processing proceeds to step S109. In step S109, the configuration management system server 10 sends the test report created in step S109 to the fault cause investigation terminal 23 accessible from the fault reproduction environment 24 or an information processing terminal such as a PC used by a tester in a form of e-mail or the like, and the processing returns to step S106.

Figure 3:
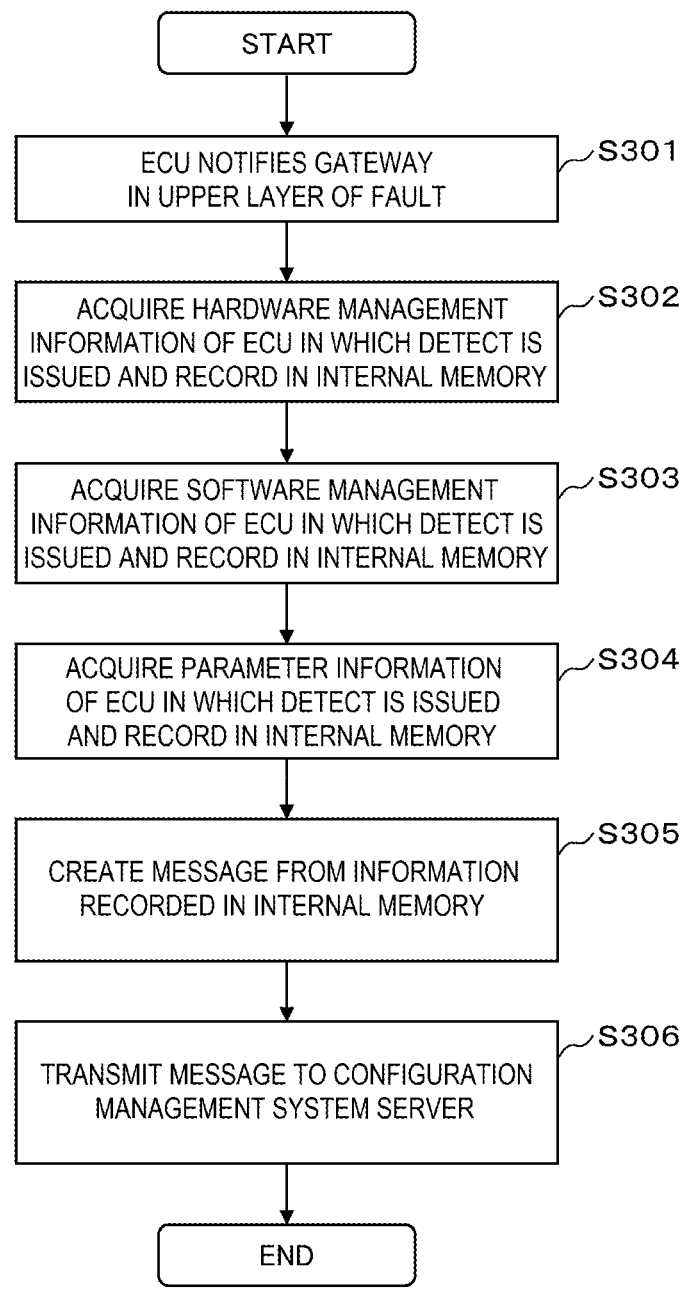
FIG. 3 is a flowchart showing a procedure, for a vehicle to transmit contents of the fault to a configuration management system server, in FIG. 2.

FIG. 3 is a flowchart showing the procedure of transmitting the contents of the fault to the configuration management system server (step S102) in FIG. 2.

In step S301, the ECU 33 detects the fault, notifies the gateway 31 of detection information together with the detection, and the processing proceeds to step S302. In step S302, the gateway 31 reads the notified detection information, acquires hardware management information including information of a hardware name and hardware ID of the ECU 33 included in the detection information, and stores the information in an internal memory of the gateway 31 in a hierarchical data form shown in FIG. 5, and the processing proceeds to step S303.

In step S303, the gateway 31 reads the notified detection information, acquires software management information including a software name and software ID of software installed in the ECU 33 included in the detection information, stores the information in the internal memory of the gateway 31 in the data form shown in FIG. 5, and the processing proceeds to step S304. In step S304, the gateway 31 acquires incidental management information such as parameter information of the ECU 33 and software installed in the ECU 33 from the ECU 33, stores the information in the internal memory of the gateway 31 in the data form shown in FIG. 5, and the processing proceeds to step S305. In step S305, the gateway 31 adds a vehicle identifier as shown in #1 of FIG. 5 to the data including the software management information, the hardware management information, and the incidental management information stored in the internal memory, creates a Message, and the processing proceeds to step S306. In step S306, the gateway 31 transmits the created message to the configuration management system server 10 via the communication device 32.

Figure 4:
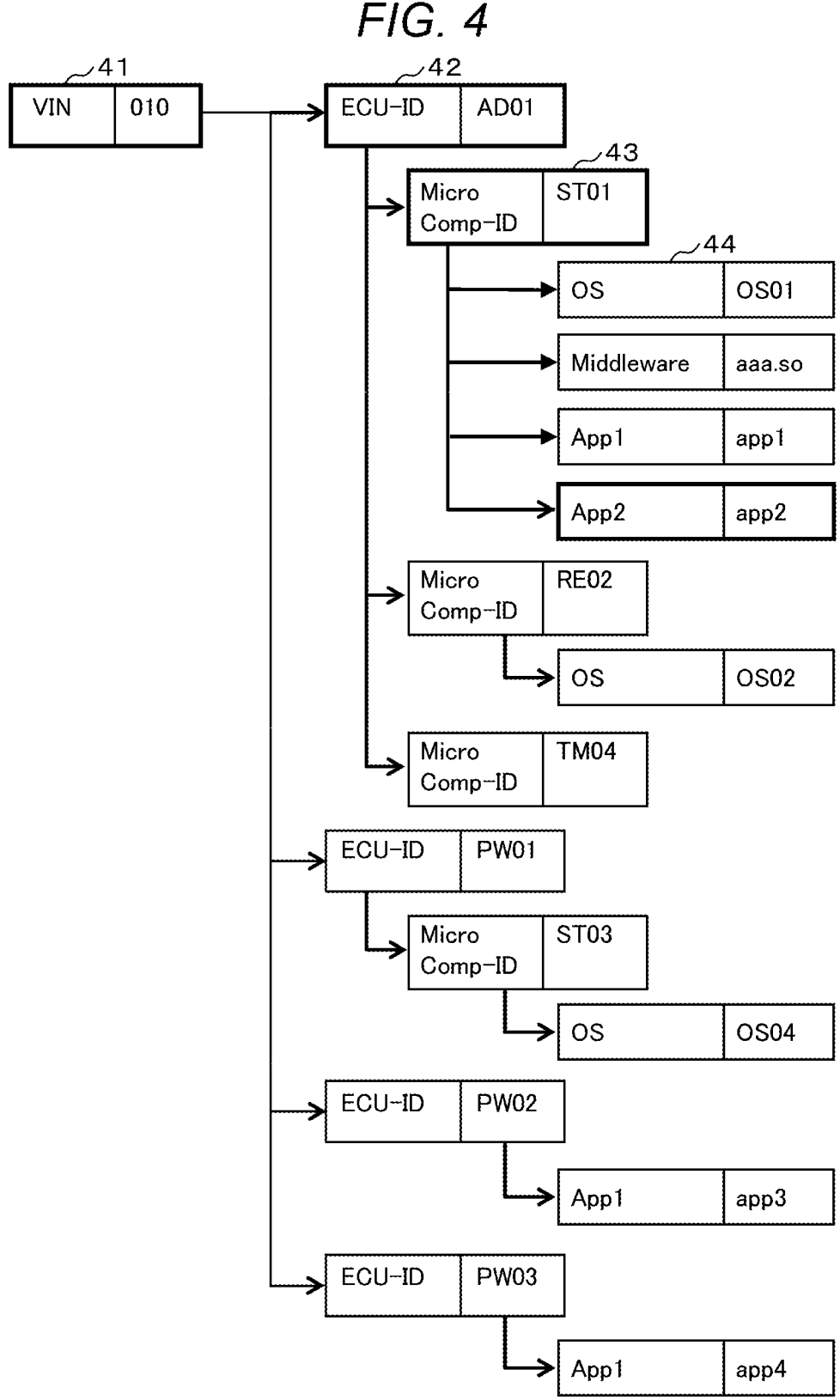
FIG. 4 is a diagram showing an example of vehicle configuration management information stored in a configuration management DB in FIG. 1.

FIG. 4 is a diagram showing an example of the configuration information stored in the configuration management DB. Thick line frame locations and arrows connecting the thick line frame locations in FIG. 4 indicate a relationship of the hardware management information, the software management information, and the incidental management information included in the configuration information received by the configuration management system server 10. The configuration management system server 10 stores a vehicle number (VIN) 41 specific to the vehicle 30 as route information, and identification information ECU-ID 42 of ECU which is the hardware on which the software is installed, is linked to and stored in a lower layer thereof. When the hardware has a plurality of microcomputers respectively, a microcomputer ID 43, which is the microcomputer identification information, is further linked to and stored in a lower layer of the ECU. Further, since software such as OS or middleware, and application programs are installed and used for each ECU or the microcomputer in the lower layer thereof, a software ID 44 which is software identification information is stored in a lower layer of the ECU-ID 42 or the microcomputer ID 43.

In FIG. 4, for example, OS01 is stored as the software ID for identifying the OS, and app2 is stored as the software ID for identifying application 2 (App2).

Although not specifically shown in FIG. 4, the software program for executing the software stored in the above software management information and the incidental management information or actual data such as the parameter information are actually stored.

FIG. 5 is an example of the message transmitted from the vehicle 30 described in FIG. 3. Contents of the message are related to a combination of the hardware and the software that cause the fault such as a failure in the configuration information shown in FIG. 4. The message is shown using a case in which the software App2 shown in FIG. 4 causes the fault as an example. As the information recorded in the message, information for each layer shown in FIG. 4 from specific information VIN of the vehicle 30 in which the fault occurs to App2 in which the fault is detected is recorded. In the recorded contents, information recorded in each line includes a type 51 for distinguishing a specific number, hardware and software, a name 52 indicating the contents of the recorded information, a value (ID) 53 for identifying the recorded contents, and parent information 54 including a set of the name 52 and the value (ID) 53 at respective upper layers of the information, which is necessary when constructing the hierarchy.

FIG. 5 shows that, for example, an upper layer of the application App2 which is the software in which the fault is detected, is a microcomputer ST01 which is hardware identified by ST01, an upper layer of the microcomputer ST01 is ECU-AD01 which is hardware identified by AD01, and an upper layer of the ECU-AD01 is a vehicle 010 identified by 010.

Figure 6:
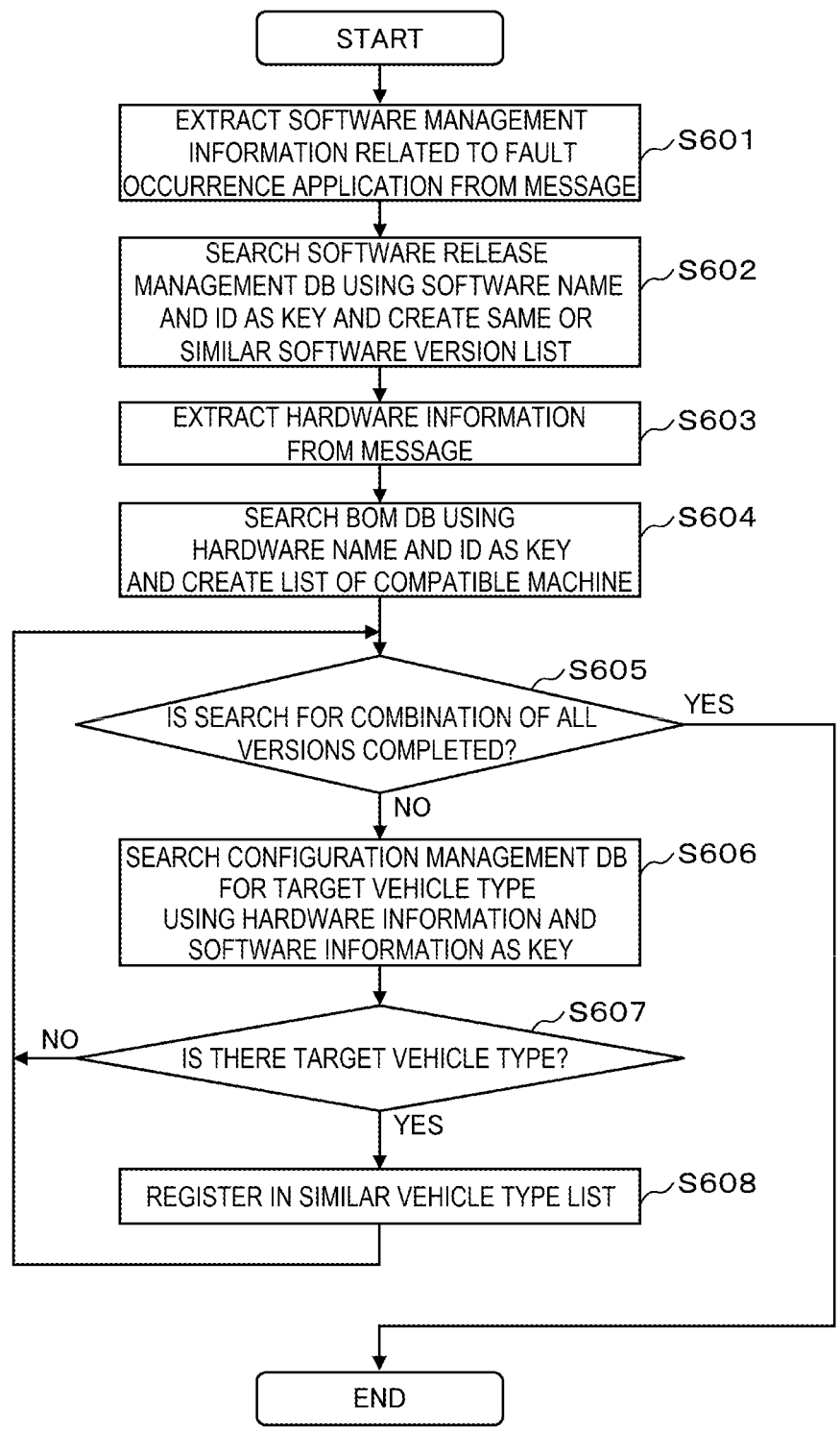
FIG. 6 is a flowchart showing a procedure, for creating a similar vehicle type list, in FIG. 2.

FIG. 6 is a flowchart showing a procedure for creating a similar vehicle type list (step S105) in FIG. 2. In step S601, the configuration management system server 10 receives the message shown in FIG. 5 from the vehicle 30, extracts the software management information included in the received message, and the processing proceeds to step S602.

In step S602, the configuration management system server 10 searches the software release management DB 13 for the software including the same software name and software ID, using the software name and software ID (for example, in FIG. 5, name: Application, value: app2) included in the software management information of the message as a key. The configuration management system server 10 acquires the information related to the same and similar software including the same software name and software ID for all combinations to create a list, and the processing proceeds to step S603. The same software is software that includes, for example, the same software name and software ID, and has the same information related to a released version. In addition, the similar software is software that includes, for example, the same software name and software ID, and has different information related to the released version.

Although not shown, the software release management DB 13 stores, for example, information related to a software configuration such as a software ID for identifying the software, a software name, a release time, a version, a usage mode, and a target terminal. The usage mode is a usage mode of the software, for example, there are a mode of using the software on a cloud and a mode of downloading and using the software. The target terminal is a terminal used by the software, for example, an information processing terminal such as a Personal Computer (PC) or a smartphone.

In step 3603, the configuration management system server 10 extracts the hardware management information included in the message, and the processing proceeds to step S604.

In step S604, the configuration management system server 10 searches the BOM DB 14 for the hardware including the same hardware name and hardware ID, using the hardware name or hardware ID included in the hardware management information as a key. The configuration management system server 10 acquires the information related to the same and similar hardware including the same hardware name and hardware ID for all the combinations to create a list, and the processing proceeds to step S605. The same hardware is hardware that includes, for example, the same hardware name and hardware ID, and has the same information related to a released version. In addition, the similar hardware is hardware that corresponds to a compatible machine or a successor even if the hardware name and hardware ID are different, in addition to the hardware that includes, for example, the same hardware name and hardware ID, and has the different information related to the released version.

Although not shown, the BOM DB 14 stores, for example, information related to a hardware configuration such as a hardware ID for identifying the hardware, a hardware name, a release time, a version, a type, a compatible machine name, and a successor name. The type is a classification of the hardware, for example, ECU and Sub Micro Computer. The compatible machine name indicates hardware that is compatible with certain hardware, for example, when being stored as ECU (Company A, hardware ID: AD02), it indicates that the hardware is compatible with the ECU whose hardware ID in Company A is identified by "AD02". The successor name indicates hardware that is a successor of certain hardware, for example, when being stored as ECU (Company B, hardware ID: AD03), it indicates that the hardware is compatible with the ECU whose hardware ID in Company B is identified by "AD03".

Therefore, the configuration management system server 10 creates the above list for hardware similar to the hardware stored in the compatible machine name and the successor name even if the hardware name and hardware ID are different.

In step S605, the configuration management system server 10 determines whether or not a search (steps S606 to S608) for a presence or absence of a target vehicle type in the configuration management DB 11 is completed for all the combinations of the hardware and the software created in steps S602 and S604. When the configuration management system server 10 determines that the search is completed for all the combinations (step S605; YES), the processing ends, and when it is determined that the search is not completed (step S605; NO), the processing proceeds to step S606.

In step S606, the configuration management system server 10 accesses the configuration management DB 11 using the combination of hardware and software information acquired in steps S602 and S604 as a key, searches for the target vehicle type, and the processing proceeds to step S607.

In step S607, the configuration management system server 10 receives a result of step S606 and determines whether or not the target vehicle type can be searched. When the configuration management system server 10 determines that the search is failed (step S607; NO), the processing returns to step S605, and on the other hand, when it is determined that the target vehicle type is searched (step S607; YES), the processing proceeds to step S608.

In step S608, when the configuration management system server 10 determines that the target vehicle type is searched, information related to the target vehicle type is registered in a list shown in FIG. 7, and the processing proceeds to step S605.

FIG. 7 is a diagram showing an example of the similar vehicle type list described in FIG. 6. Information of the similar vehicle type list includes information of a vehicle name 71, a hardware name 72, a hardware ID 73, a software name 74, a software ID 75, a distinction 76 for distinguishing the same configuration as that recorded in the message shown in FIG. 5 and the similar configuration with a different version of the software or the hardware, and a different compatibility machine or successor. That is, the distinction 76 is information for identifying whether or not software management information, hardware management information, and incidental management information included in data is the same as the software management information, hardware management information, and incidental management information recorded in the message, when both are the same information, "corresponding" is stored, and when both are different information, "related" is stored. The vehicle name 71 is determined in advance in association with the VIN included in the configuration information shown in FIG. 4. In FIG. 7, the vehicle name of a first record and a second record is the same "Sedan A", but are identified by different VINs.

Figure 8:
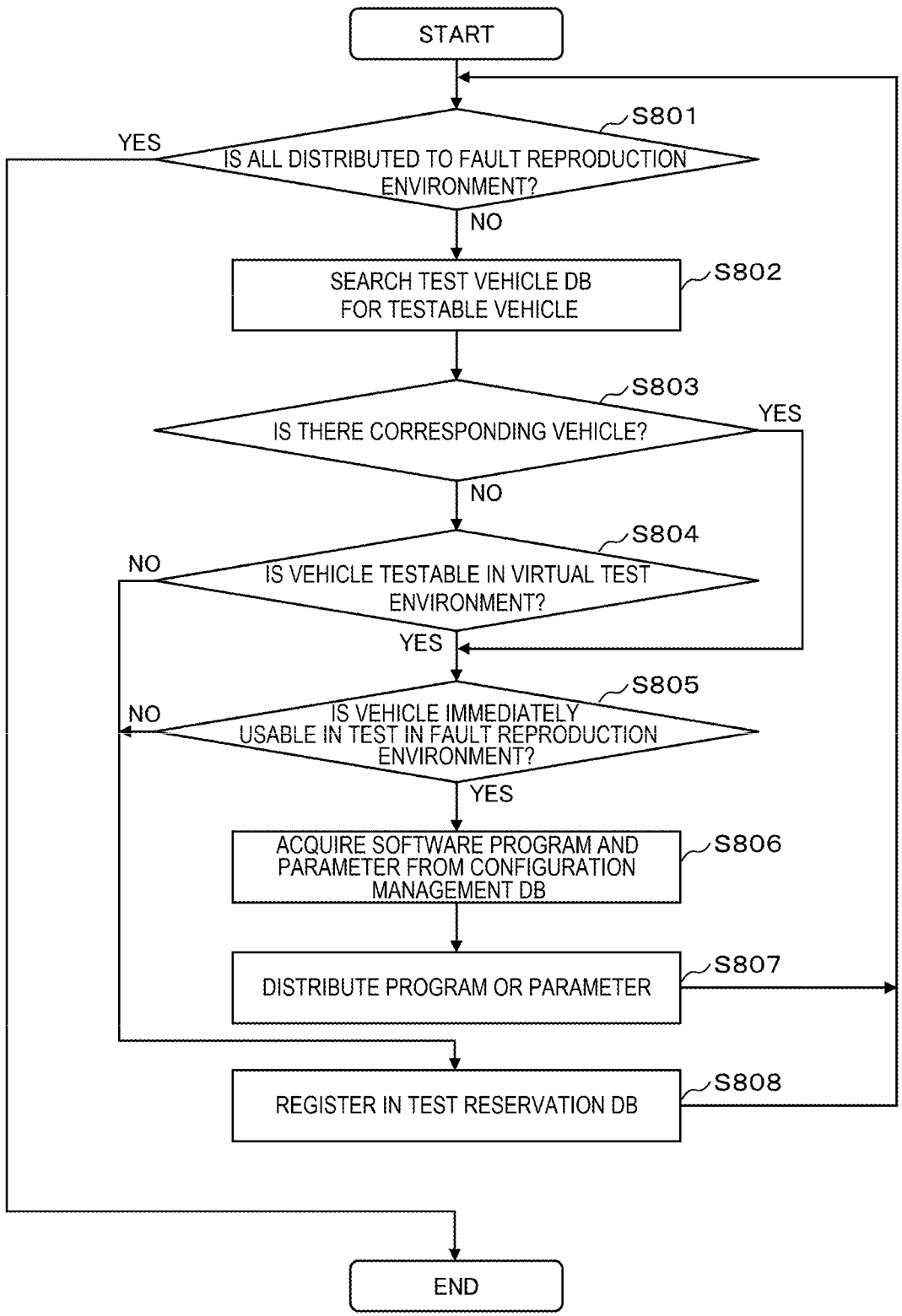
FIG. 8 is a flowchart showing a procedure of the test environment distribution in FIG. 2.

FIG. 8 is a flowchart showing a procedure fora test environment distribution (step S107) in FIG. 2.

In step S801, the configuration management system server 10 determines whether or not a distribution of software programs or parameter's for all records in the similar vehicle type list shown in FIG. 7 is completed. When the configuration management system server 10 determines that the distribution of software programs or parameters for all vehicles is completed (step S801; YES), the processing ends. On the other hand, when the configuration management system server 10 determines that the distribution of the software programs or the parameters for all the vehicles is not completed (step S801; NO), the processing proceeds to step S802.

In step S802, the configuration management system server 10 picks up one record in order from the similar vehicle list shown in FIG. 7, searches the test vehicle management DB 12 for a testable vehicle using the vehicle name included in the record as a key, and the processing proceeds to step S803. In the test vehicle management DB 12, a vehicle name of a vehicle of a testable vehicle type is stored in association with the test environment 242 of the fault reproduction environment 24 or the fault cause investigation terminal 23.

In step S803, the configuration management system server 10 acquires a result of step S802 and determines whether there is a corresponding vehicle. When the configuration management system server 10 determines that there is a corresponding vehicle (step S803; YES), the processing proceeds to step S805, and when it is determined that there is no corresponding vehicle (step S803; NO), the processing proceeds to step S804.

In step S804, the configuration management system server 10 acquires the result of step S802, searches the virtual test environment management DB 16 to determine whether or not a test can be performed in the virtual test environment such as Electronic Integrated PlatForm (EIPF), and determines whether or not the virtual test environment is usable. When the configuration management system server 10 determines that the virtual test environment is usable (step S804; YES), the processing proceeds to step S805, and when it is determined that the virtual test environment is unusable (step S804; NO), the processing proceeds to step S808. It is assumed that the virtual test environment management DB 16 stores a server name and an access destination of the virtual test environment management server 22 that is not Currently used and is usable in the virtual test environment. It is assumed that the virtual test environment management server 22 stores configuration information of a virtual vehicle including the same configuration information as that of the test vehicle, and a fault reproduction test can be executed in a virtual environment when the programs or the parameters are distributed.

In step S805, the configuration management system server 10 determines whether or not the test vehicle 241 in the fault reproduction environment 24 or the virtual test environment constructed in the virtual test environment management server 22 are in a usable state. When the configuration management system server 10 determines that the test vehicle or the virtual test environment are in the usable state (step S805; YES), the processing proceeds to step S806, and when it is determined that the test vehicle or the virtual test environment are not in the usable state (step S805; NO), the processing proceeds to step S808. A determination as to whether or not the test vehicle 241 in the fault reproduction environment 24 is in the usable state may be, for example, determined as usable when the test vehicle 241 in the fault reproduction environment 24 is stored in the test vehicle management DB 12. A determination as to whether or not the virtual test environment is in the usable state may be, for example, determined as usable when the virtual test environment management server 22 is stored in the virtual test environment management DB 16.

In steps S806 and S807, the configuration management system server 10 acquires a corresponding software program or parameter from the configuration management DB 11 using the software name and software ID shown in FIG. 7 as a key, the program and parameter are distributed to the test vehicle 241 (or the fault cause investigation terminal 23) in the fault reproduction environment 24 or the virtual test environment management server 22, and the processing returns to step S801.

In step S808, since the test vehicle or the virtual test environment cannot be used immediately at this time point when it is determined as NO in step S804 or S805, the configuration management system server 10 registers use reservation information in the test reservation DB 17 with reference to whether or not the test vehicle 241 is registered in the test vehicle management DB 12 or free time of the virtual test environment management server 22, and the processing returns to step S801. For example, the free time may be determined by storing a schedule of the virtual test environment management server 22 together with the server name or the access destination of the virtual test environment management server 22 stored in the virtual test environment management DB 16.

FIG. 9 is a diagram showing an example of the fault information input from the fault cause investigation terminal 23 or the dealer vehicle management server 21 and stored in the fault report DB 15. The information is information used when acquiring the fault information shown in step S108 of FIG. 2, and a fault occurrence condition indicating an occurrence condition under which the fault occurs in an abnormal vehicle, such as a climate, a running state and a running environment of the vehicle, is stored. The information includes a management number 91, a fault occurrence date 92, a specific number VIN 93 of the vehicle in which the fault occurs, a name 94 of the vehicle in which the fault occurs, a model 95 of the vehicle in which the fault occurs, a prime mover type 96 of the vehicle in which the fault occurs, a content 97 of the fault, a name 98 of the hardware in which the fault occurs, an ID 99 of the hardware in which the fault occurs, a name 910 of the software in which the fault occurs, an ID 911 of the software in which the fault occurs, a mileage 912 of the vehicle at the time of the fault occurrence, a running route 913 when the fault occurs, information 914 on location where the fault is actualized, weather 915 when the fault occurs, others 916 which is supplementary information when the fault occurs. These pieces of information are collected by another system and stored in the fault report DB 15 separately from the processing shown in FIG. 2.

FIG. 10 is a diagram showing an example of the test report shown in step S109 of FIG. 2. The test report includes management information 1001 including a number, a title, and a content of the fault desired to be reproduced, vehicle information 1002 including a name, a model, and a prime mover type of the vehicle in which the fault occurs, configuration information 1003 including a VIN, a hardware name, a hardware ID, a software name, and a software ID, reference information 1004 including a mileage and a running route of the vehicle at the time of the fault occurrence, a fault actualizing location, a weather, and supplementary information, and related vehicle information 1005 including related vehicle information acquired in similar vehicle list acquisition in step S105 of FIG. 2. FIG. 10 shows that the same configuration management system server 10 reads information (#1) stored in a first record of the fault information shown in FIG. 9 to record the information in the management information 1001, the vehicle information 1002, the configuration information 1003, and the reference information 1004, reads information stored in second, third, and fourth records (#2, #3, #4) in which the distinction 76 is "related" in the similar vehicle type list shown in FIG. 7 to record the information in the related vehicle information 1005, and outputs the test report. In FIG. 10, the information (#1) stored in the first record in which the distinction 76 is "corresponding" in the similar vehicle type list shown in FIG. 7 is not included in the test report, but the information may be included in the test report. In step S109 shown in FIG. 2, the configuration management system server 10 transmits the test report including these pieces of information to, for example, the fault cause investigation terminal 23 and the test report is used in a fault reproduction test in the fault reproduction environment 24. As a transmission destination, for example, a mail address of the fault cause investigation terminal 23 may be stored in the configuration management system server 10 in advance.

In general, a fault reproduction of the vehicle occurs based on not only information related to the hardware or the software in which the fault occurs, but also composite overlapping of conditions such as the climate, the running state and the running environment of the vehicle. Therefore, after the fault occurs, it takes a lot of man-hour to construct an environment that reproduces the fault, but the fault information such as that shown in FIG. 9 is included in the test report as in the embodiment, the fault reproduction environment can be further quickly constructed, and the fault can be quickly reproduced.

In the above embodiment, an example is described in which the software program stored in the configuration management DB 11 is distributed to the test vehicle or the virtual test environment in the fault reproduction environment 24 of the automobile manufacturer. However, when the dealer (vehicle dealer) has the fault reproduction environment as a distribution destination, it is conceivable to execute the fault reproduction test using a test vehicle 241*b* such as a test driving vehicle held by the dealer or the fault cause investigation terminal 23 of the dealer. In this case, the dealer vehicle management server 21 requests an execution of processing for registering the test vehicle 241*b* as the test vehicle in the test vehicle management DB 12, and the configuration management system server 10 may execute the registration processing in accordance with the request.

As described above, in this embodiment, the fault reproduction assist system 1000 that assists a fault reproduction of an abnormal vehicle includes a configuration information acquisition unit (for example, a configuration information acquisition program executed by a CPU of the configuration management system server 10) that acquires, based on configuration information that is received from the abnormal vehicle (for example, the vehicle 30) and that includes hardware information of hardware (for example, ECU 33) in which an abnormality is detected and vehicle configuration information stored in advance in a storage unit (for example, the test vehicle management DB12), configuration information including the same hardware information as the hardware information of the abnormal vehicle; a configuration information determination unit (for example, a configuration information determination program executed by the CPU of the configuration management system server 10) that acquires from the storage unit (for example, the software release management DB13) software that includes the same software information as software information included in the configuration information acquired by the configuration information acquisition unit; and a distribution unit (for example, a distribution program executed by the CPU of the configuration management system server 10) that distributes the software acquired by the configuration information determination unit to a fault reproduction environment for reproducing a fault. Therefore, it is possible to quickly provide an environment for performing a reproduction test in consideration of a difference in the software, for example, when the hardware configuration is the same.

Further, since the configuration information determination unit acquires software information with different software versions from the storage unit (for example, the software release management DB 13), outputs the software information as configuration information of a similar vehicle type similar to the abnormal vehicle (for example, the similar vehicle type list shown in FIG. 7), and acquires software including the software information of the output configuration information, it is possible to quickly provide the environment for performing the reproduction test in consideration of a difference in a version when the software is the same.

Further, since the configuration information determination unit acquires hardware information of the hardware which is the compatible machine or the successor of the hardware from the storage unit (for example, the BOM DB 14), outputs the hardware information as the configuration information of the similar vehicle type similar to the abnormal vehicle (for example, the similar vehicle type list shown in FIG. 7), and acquires the software including the software information of the output configuration information, it is possible to quickly provide the environment for performing the reproduction test in consideration of a difference in the compatible machine or the successor when the hardware is the same.

Further, since the distribution unit distributes the fault information (for example, the fault information shown in FIG. 9) indicating the fault occurrence condition of the fault that occurs in the abnormal vehicle and stored in advance in the storage unit (for example, the fault report DB 15), the configuration information, and the software to the fault reproduction environment (for example, the fault reproduction environment 24 or the fault cause investigation terminal 23), information about a surrounding environment for performing the reproduction test can be provided, and the fault can be reproduced more Quickly in consideration of a situation at the time of the fault occurrence.

What is claimed is:

1. A fault reproduction assist system that assists a fault reproduction of an abnormal vehicle, the fault reproduction assist system comprising:
a memory that stores information;
a communications interface operatively coupled to and in communication with the memory; and
a processor operatively coupled to and in communication with the memory and the communication interface, the processor:
acquires, based on configuration information that is received from the abnormal vehicle and that includes hardware information of hardware in which an abnormality is detected and vehicle configuration information stored in advance in the memory, configuration information including the same hardware information as the hardware information of the abnormal vehicle;

acquires from the memory software that includes software information, as wherein the software information is included in the configuration information acquired by the processor;

based upon a determination that the configuration information acquired by the processor is different from a stored configuration in the memory and that all configuration information has not been distributed, and based upon a determination that the abnormal vehicle is testable in a virtual test environment and usable in a fault reproduction environment, the processor distributes via the communications interface the software acquired by the processor to a fault reproduction environment for reproducing a fault.

2. The fault reproduction assist system according to claim 1, wherein

The processor acquires software information with different software versions from the memory, outputs the software information as configuration information of a vehicle type corresponding to the abnormal vehicle, and acquires software including the software information of the output configuration information.

3. The fault reproduction assist system according to claim 2, wherein

The processor acquires hardware information of hardware which is a compatible machine or a successor of the hardware from the memory, outputs the hardware information as the configuration information of the vehicle type corresponding to the abnormal vehicle, and acquires the software including the software information of the output configuration information.

4. The fault reproduction assist system according to claim 3, wherein the processor distributes via the communications interface fault information indicating an occurrence condition of a fault that occurs in the abnormal vehicle and stored in advance in the memory, the configuration information, and the software to the fault reproduction environment.

5. A fault reproduction assist method for assisting a fault reproduction of an abnormal vehicle, the fault reproduction assist method comprising:

a processor operatively coupled to and in communication with a memory and a communications interface acquiring, based on configuration information that is received from the abnormal vehicle and that includes hardware information of hardware in which an abnormality is detected and vehicle configuration information stored in advance in the memory, configuration information including the same hardware information as the hardware information of the abnormal vehicle;

the processor acquires from the memory software that includes software information, wherein the software information is included in the configuration information acquired by the processor; and based upon a determination that the configuration information acquired by the processor is different from a stored configuration in the memory and that all configuration information has not been distributed, and based upon a determination that the abnormal vehicle is testable in a virtual test environment and usable in a fault reproduction environment, the processor distributes via the communications interface the software acquired by the processor to a fault reproduction environment for reproducing a fault.

6. The fault reproduction assist method according to claim 5, wherein the processor acquires software information with different software versions from the memory, outputs the software information as configuration information of a vehicle type corresponding to the abnormal vehicle, and acquires software including the software information of the output configuration information.

7. The fault reproduction assist method according to claim 6, wherein the processor acquires hardware information of hardware which is a compatible machine or a successor of the hardware from the memory, outputs the hardware information as the configuration information of the vehicle type corresponding to the abnormal vehicle, and acquires the software including the software information of the output configuration information.

8. The fault reproduction assist method according to claim 7, wherein the processor distributes via the communications interface fault information indicating an occurrence condition of a fault that occurs in the abnormal vehicle and stored in advance in the memory, the configuration information, and the software to the fault reproduction environment.

* * * * *